United States Patent
Landsiedel

(10) Patent No.: US 6,294,986 B1
(45) Date of Patent: *Sep. 25, 2001

(54) METHOD AND SYSTEM FOR DETERMINING A REGULATOR OBJECT

(75) Inventor: Thomas Landsiedel, Reichertshofen (DE)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/486,755
(22) PCT Filed: Aug. 24, 1998
(86) PCT No.: PCT/EP98/05359
  § 371 Date: May 16, 2000
  § 102(e) Date: May 16, 2000
(87) PCT Pub. No.: WO99/10193
  PCT Pub. Date: Mar. 4, 1999

(30) Foreign Application Priority Data

Aug. 25, 1997 (DE) .............................................. 197 36 968
Aug. 6, 1998 (DE) .............................................. 198 35 518

(51) Int. Cl.[7] ...................................................... B60Q 1/00
(52) U.S. Cl. ........................... 340/435; 340/436; 340/903; 701/301
(58) Field of Search ................................... 340/435, 436, 340/903; 701/301

(56) References Cited

U.S. PATENT DOCUMENTS 5,572,428   11/1996   Ishida et al. .......................... 701/301
6,067,031  *  5/2000   Janky et al. .......................... 340/903

FOREIGN PATENT DOCUMENTS 19614061   10/1996   (DE) .
19637245    3/1998   (DE) .
 0657857    6/1995   (EP) .

* cited by examiner

Primary Examiner—Daryl Pope
(74) Attorney, Agent, or Firm—Martin A. Farber

(57) ABSTRACT

A method for determining a control object which is situated in an expected traveling corridor of a vehicle whose distance from the control object is measured and adjusted to a desired distance. The method for reliably determining the control object which enables reliable distance control even in the event of momentary and sudden changes in the traveling corridor of the vehicle determines an object corridor which covers the traveling corridor and is wider than the traveling corridor of the vehicle, control with respect to the control object being effected as long as the latter stays in the object corridor of the vehicle.

17 Claims, 5 Drawing Sheets

METHOD AND SYSTEM FOR DETERMINING A REGULATOR OBJECT

FIELD AND BACKGROUND OF THE INVENTION

Method for determining a control object whose distance from the following vehicle is measured, the distance between the control object and a following vehicle being adjusted to a desired distance if the control object is situated in an expected traveling corridor of the following vehicle, and an arrangement for carrying out the method.

In automatic speed and distance control systems for detecting the traffic situation, it is customary to predict a traveling corridor of the motor vehicle with the aid of signals from yaw rate sensors or transverse acceleration sensors. In other words, these systems ascertain the location at which the vehicle will stay after a predetermined period of time has elapsed, and which vehicles traveling ahead will stay in the traveling corridor of the system'vehicle.

For distance-controlled traveling, the control object is determined from the objects determined by the radar and from the calculated traveling corridor. This object is used for distance control purposes by a distance control device in the form of a series-path controller. The vehicle which is the nearest one that stays in the predicted traveling corridor is identified as the control object.

In this case, the traveling corridor is an assumption projected into the future in which the vehicle travels in the direction prescribed by the radius that has been determined. If this control object then leaves the predicted traveling corridor it is no longer identified as the control object.

That also applies to borderline situations such as cornering or skidding of the vehicle.

SUMMARY OF THE INVENTION

The invention is thus based on the object of providing a method for reliably determining the control object which permits reliable distance control even in the event of momentary and sudden changes in the traveling corridor of the vehicle.

The object is achieved according to the invention wherein even after the control object has left the traveling corridor, the distance continues to be controlled with respect to this control object as long as the control object stays in an object corridor which is wider than the traveling corridor of the vehicle.

The advantage of the invention is that even in the event of the traveling corridor slightly fluctuating back and forth, in the event of a change in the radius of the roadway, and in the event of the vehicles traveling in an offset fashion within a lane, which lead to a change in the predicted traveling corridor, the control object can also continue to be reliably identified.

This also applies, in particular, to cornering and skidding of the vehicle. The traveling corridor of the vehicle to be controlled serves as a capture corridor for the control object, while the object corridor, which covers the traveling corridor, is utilized as an outlet corridor of the control object. Consequently, a narrower corridor (traveling corridor) is utilized for determining the control object, while a new further control object is determined only if the previous control object is situated outside the object corridor.

It is advantageous for the width of the object corridor of the vehicle to be chosen in a distance-dependent manner. In this case, it appears to be expedient for the object corridor to be chosen to be smaller for control objects which are situated near the vehicle to be controlled than for objects which stay further away from the vehicle to be controlled.

In a development, the object corridor of the vehicle is as wide as a roadway width of the roadway on which the vehicle to be controlled is moving. Usually, the traveling corridor is always narrower than the roadway of the vehicle. However, it must at least always be as wide as the distance between two wheels of an axle of the vehicle.

The object corridor can thus be set to different road situations, depending on whether the vehicle is moving on an ordinary road or an interstate highway.

In order to determine the control object, the vehicle to be controlled monitors other vehicles traveling ahead in a wire-free manner and selects, from the vehicles which are situated in its traveling corridor, the vehicle which is at the smallest distance from the vehicle to be controlled, and is identified as the control object.

In a refinement, the object corridor can be derived from the traveling corridor of the vehicle to be controlled. This ensures that the object corridor and the traveling corridor of the vehicle to be controlled always refer to the same vehicle reference point.

In a development, the traveling corridor of the vehicle is determined from the yaw rate of the vehicle which is measured by a yaw rate sensor.

As an alternative to this, the traveling corridor of the vehicle is determined by way of the turn radius determined from the differential speed of two vehicle wheels, in particular the wheels of one axle.

This has the advantage that, as a result of the measurement of the wheel speeds, the actual difference in speed at both vehicle wheels is incorporated into the determination of the traveling corridor. The latter can thus be determined highly accurately, since the traveling dynamics are taken directly into account in this way.

It is advantageous for the wheel speed of the two vehicle wheels to be measured and the yaw rate of the vehicle to be determined from the difference between the two wheel speeds.

In an arrangement for carrying out the method, a sensor which detects objects appearing in the direction of travel of the vehicle is connected to a sensor signal conditioning arrangement which passes the distance and relative speed of the monitored objects to a control device, which determines the object corridor of the vehicle.

The arrangement according to the invention thus enables the object lane to be determined in a simple manner. No further additional devices are necessary.

In a refinement, the sensor is arranged on the front of the vehicle to be controlled, for the purpose of detecting the vehicles traveling ahead. The sensor operates according to the echo principle and is advantageously a radar sensor.

In a refinement, the control device determines the traveling corridor of the vehicle and sets the distance from the control object.

Consequently, a space-saving sensor unit is made possible which takes up only insignificantly more structural space than the sensor with an integrated signal evaluation circuit.

BRIEF DESCRIPTION OF THE DRAWINGS

The invention permits numerous exemplary embodiments. One will be explained in more detail with reference to the drawings illustrated in the figures.

In the figures

DETAILED DESCRIPTION OF THE PREFERRED EMBODIMENT

Figure 1:
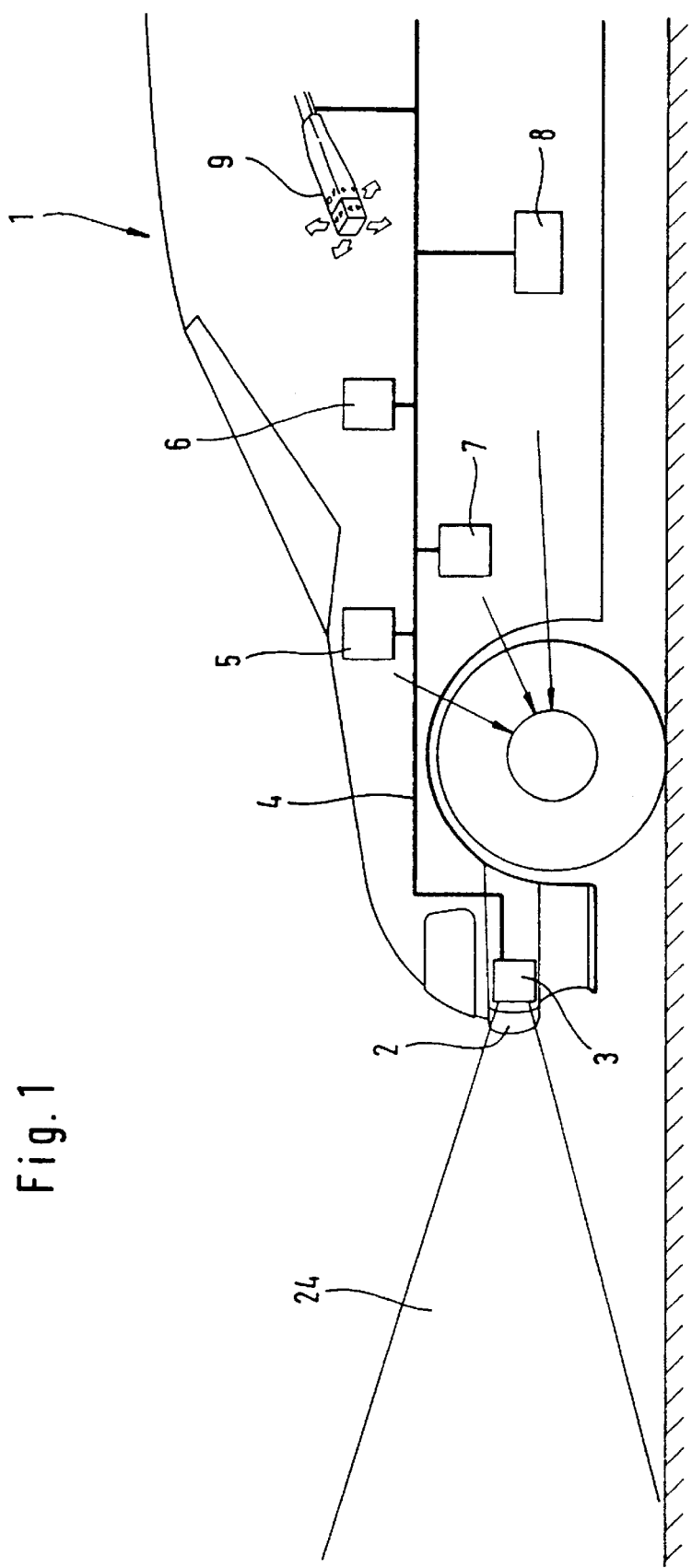
FIG. 1 shows an arrangement of the distance control system for motor vehicles.

In FIG. 1, an automatic speed and distance control system 3 for maintaining the safety distance of vehicles is arranged on the fender 2 of a motor vehicle 1. When the controlled vehicle approaches a slower vehicle, the distance and the speed relative to the vehicle traveling ahead are automatically regulated. If the traveling corridor is free again, the system accelerates the vehicle to the desired speed which is set beforehand.

The speed and distance control system 3 is switched on/off by an operating lever 9. The desired speed of the vehicle is also set with the aid of the operating lever 9. The traveling speed desired by the driver is stored, increased or reduced in this way.

The automatic speed and distance control system 3 is connected to the engine controller 5, the brake 7 and the transmission 8 via a bus system 4. Electronic commands regulate the distance and the speed relative to the vehicle traveling ahead. The current speed and also the distance relative to the vehicle traveling ahead are displayed by means of a display unit 6, which is likewise driven by the speed and distance control system 3 via the bus system 4, preferably a CAN bus.

Figure 2:
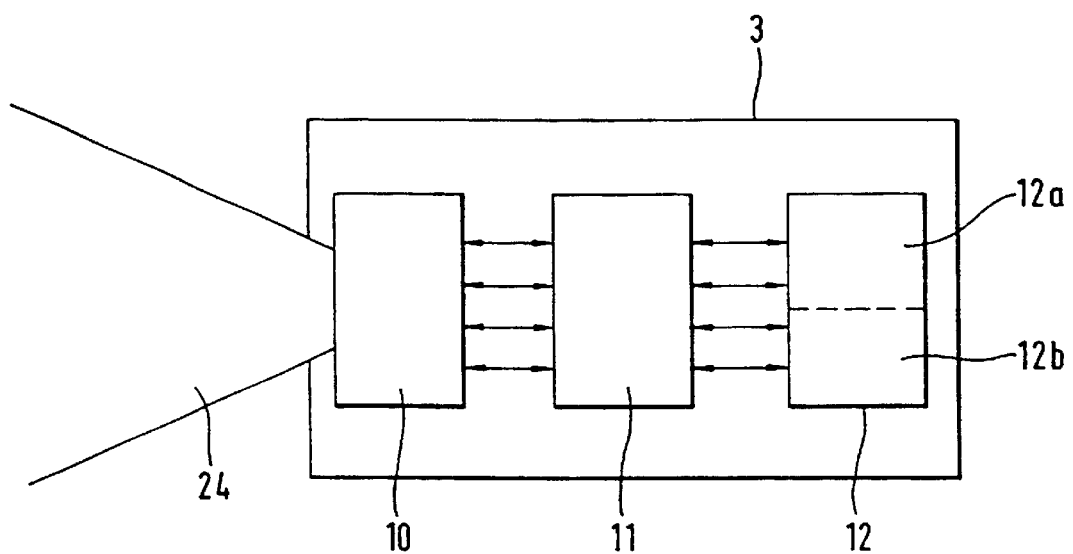
FIG. 2 shows a basic design of the distance control system.

As illustrated in FIG. 2, the automatic speed and distance control system 3 forms a structural unit between the sensor 10, the sensor signal conditioning arrangement 11 and the distance control system 12.

In this case, the distance control system 12 has a device 12a for determining the traveling and object corridors of the vehicle 1 and also a series-path controller 12b, which establishes the distance from a control object.

In this case, the sensor 10 is a radar or laser sensor which emits signals at regular intervals, e.g. every 60 ms, in the direction of travel of the vehicle, said signals being reflected from the vehicles which are situated in the signal beam. The signal conditioning circuit 11 determines the distance and the relative speed of the vehicles traveling ahead from these returned signals. These measurement results are forwarded to the distance control system 12 by the signal conditioning arrangement 11.

Figure 3:
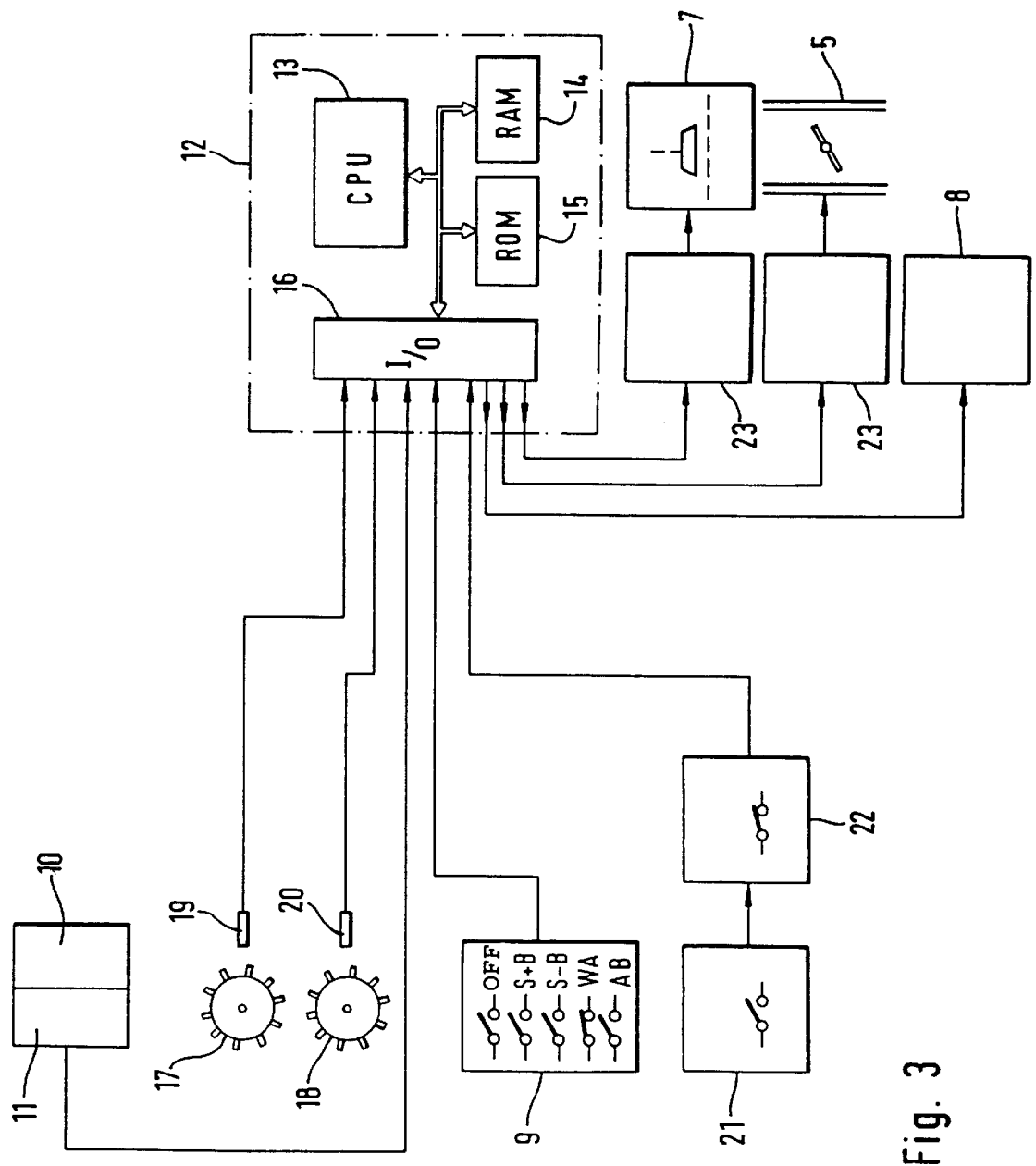
FIG. 3 shows an arrangement for determining the traveling corridor of the motor vehicle.

As illustrated in FIG. 3, the distance control system 12 comprises a powerful microcomputer, which is in turn constructed from a central processing unit 13, a main memory 14, a read-only memory 15 and an input/output unit 16. In this case, the input/output unit 16 receives from the sensor signal conditioning arrangement 11, as already described, the information about the distance and the relative speed of the vehicles traveling ahead. The tasks of determination of the traveling corridor and object corridor and series-path control are performed by this microcomputer.

On the vehicle itself, incremental disks 17 and 18 are arranged on the respective two front wheels (not illustrated in any detail). Rotational-speed sensors 19, 20 are arranged opposite the incremental disks 17, 18. The rotational-speed signals detected by the rotational-speed sensors 19, 20 are likewise fed to the microcomputer 12 via the input/output unit 16. From the signals (distance signal and relative speed signal) supplied by the sensor 10 and with the aid of the wheel speeds, the microcomputer 12 calculates the difference in speed between the two vehicles and from these determines the minimum safe distance. If the latter is undershot, the system warns the driver with an activated warning function.

If the distance mode is switched on by the driver, the distance from the vehicle traveling ahead is automatically adjusted to a selectable distance. By the pressing of a key on the operating switch 9, as already explained, a desired speed and/or the desired distance is set and stored and maintained by the system.

When a slower vehicle is approached, the microcomputer 12, by automatically closing the throttle valve 5, performs a reduction of the vehicle speed and thus regulates the set desired distance from the vehicle traveling ahead, the desired distance always being greater than/equal to the legally prescribed safety distance. In addition to the automatic closing of the throttle valve 5, it is also possible to act on the brake 7 and/or drive the transmission controller 8 for the purpose of reducing the traveling speed. In this case, the throttle valve 5, the brake 7 or the transmission 8 is driven via a respective electrical output stage 23. If the traveling corridor is free again, the distance controller 12 accelerates the vehicle to the maximum speed set. With a vehicle traveling ahead, the distance control is always active.

Furthermore, the microcomputer 12 is connected to switches of the vehicle brake 21 and of the vehicle clutch 22. If the driver actuates these via the clutch and brake pedals, they cause the control to be switched off in normal operation.

In the microprocessor 12, the series-path controller 12b forms the comparison between a desired value and an actual value of a control concept stored in the software. If one is in the control range, then the microcomputer outputs an output signal which is determined by the control concept.

The determination of the control object will now be explained in more detail with reference to FIGS. 4 and 5.

From the rotational-speed signals acquired by the rotational-speed sensors 19, 20 (step 1—FIG. 5), the device for the determination 12a of the traveling and object corridors, which device is formed in the microprocessor 12, determines the yaw rate of the motor vehicle (steps 2 and 3).

The yaw rate is determined as follows:

$$\dot{\varphi} = \frac{\Delta V_{VR}}{s + v^2 \cdot k}$$

where $\Delta V_{VR}$ is the difference in speed between the front wheels of the motor vehicle, s is the track width between the front wheels, v is the vehicle speed, k is the dynamic correction factor.

With the aid of the yaw rate thus determined, the traveling corridor F of the motor vehicle 1 is then calculated from the turn radius $$R = \frac{V_R}{\dot{\phi}}$$

(Step 4).

The radius traveled by each front wheel is determined from the quotient of the wheel speed $V_R$ divided by the yaw rate $\dot{\phi}$.

In step 5, the traveling corridor F is formed as a function of the radii of the right front wheel $R_R$ and of the left front wheel $R_L$. At the same time, the object corridor O is formed as a function of the right and left front wheels, the track being widened, however, with the result that the object corridor is formed as a function of $R_L+X_L$, $R_R+X_R$.

In step 6, the vehicle 1 detects a plurality of vehicles E1, E2, E3 (cf. FIG. 4) with the aid of the emitted radar beam 24. From these three objects E1, E2, E3, the sensor evaluation electronic unit 11 determines the distance from the vehicle 1 to be controlled in the form of the position coordinates x, y and the relative speed of each vehicle relative to the motor vehicle 1. Furthermore, the system monitors whether the detected object E1, E2, E3 is detected again by the radar beam 24 in the event of each measurement.

Figure 4:
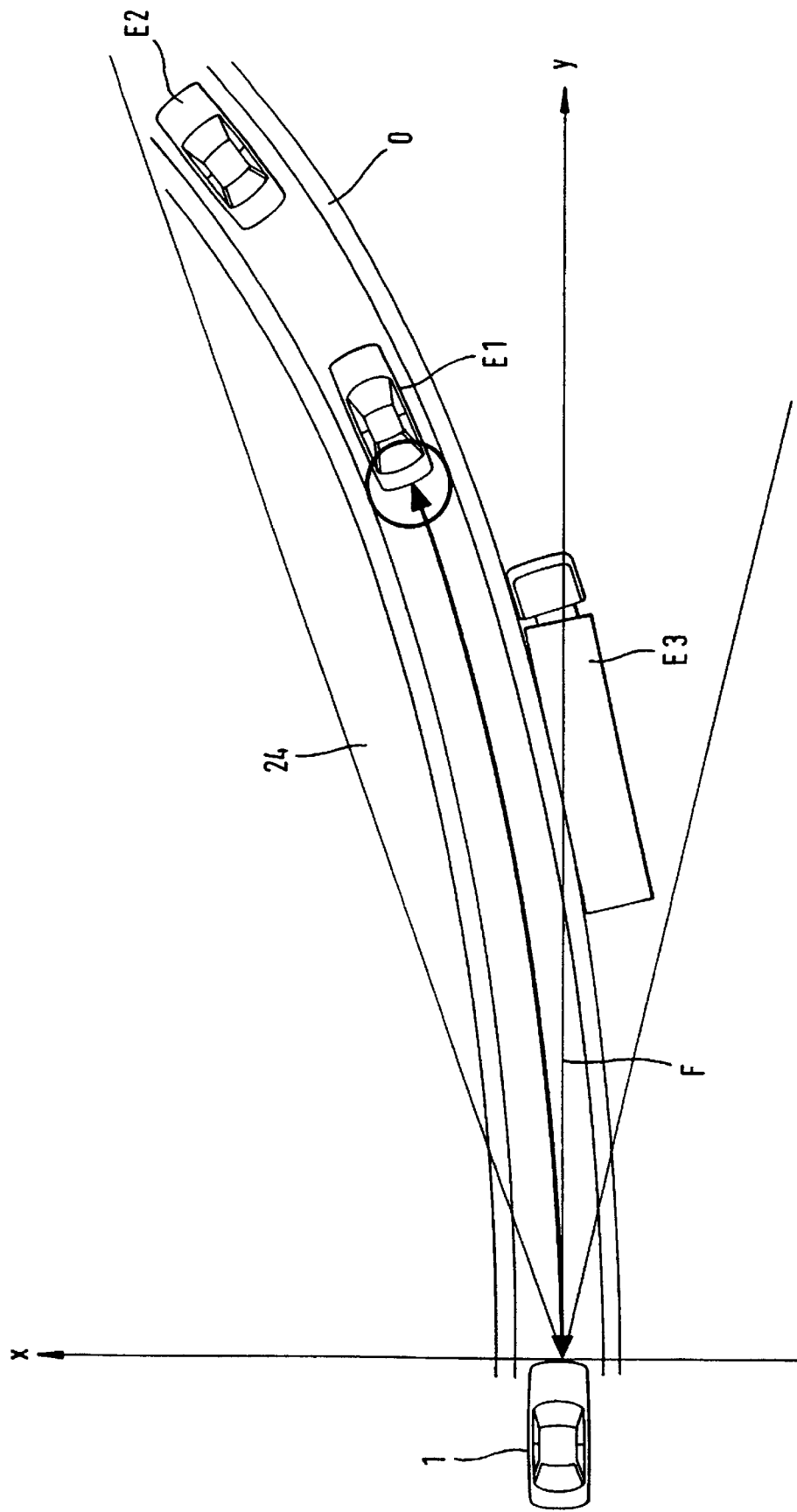
FIG. 4 shows the detection of the control object and, FIG. 5 shows a method for determining the control object which is carried out by the arrangement as shown in FIG. 1.
Figure 5:
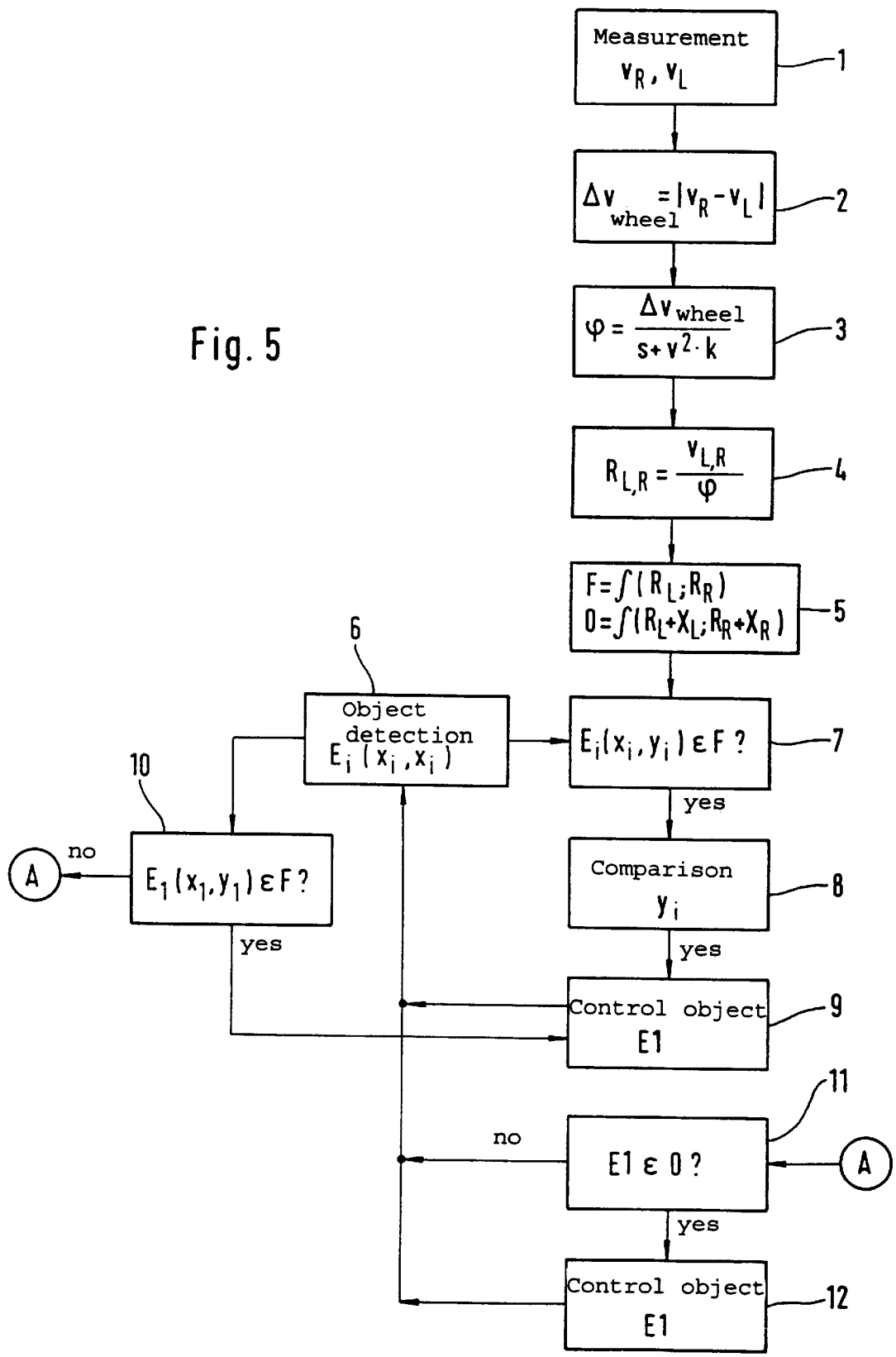

For simplification purposes, FIG. 4 illustrates a coordinate system whose origin is situated in the center of the front of the motor vehicle 1. The radar sensor is situated at this location. The object E1 has the coordinates $x_1$, $y_1$, the object E2 the coordinates $x_2$, $y_2$ and the object E3 the position coordinates $x_3$, $y_3$.

In step 7, a check is then made to see whether the objects E1, E2 and E3 stay in the traveling corridor F. As is evident, the object E3 travels outside the traveling corridor F and is disregarded for the further consideration. In order then to ascertain which vehicle is the nearest to the vehicle to be controlled, in step 8 the distances between the relevant control vehicles E1, E2 and the vehicle K to be regulated are compared. In the present case, $y_1$ is less than $y_2$, in other words the object E1 is nearer to the motor vehicle K and is thus considered as the control object in step 9.

After this control object E1 has been selected, the distance control is set with respect to this control object. Afterwards, the method moves to step 6 again and the objects situated in the traveling corridor are detected by means of a radar beam. A check is subsequently made in step 10 to see whether the control object E1 is still situated in the traveling corridor F. If this is the case, it continues to be utilized as the control object for the distance control.

If it is ascertained in step 10 that the control object E1 no longer stays in the traveling corridor, a check is made in step 11 to see whether the control object E1 stays in the object corridor. If the object E1 is detected in the object corridor, then in step 12 the system continues to effect control with respect to the control object E1. If, however, it is ascertained in step 11 that the control object has also left the object corridor, the control object E1 is disregarded for the distance control. The method returns to the object detection in step 6, where all newly detected objects are checked in the manner described and the control object is selected.

What is claimed is:

1. A method for determining a control object whose distance from a following vehicle is measured, the distance between the control object and the vehicle being adjusted to a desired distance if the control object is situated in an expected traveling corridor of the following vehicle, comprising the step of even after the control object has left the traveling corridor, continuing controlling of the distance with respect to said control object as long as the control object stays in an object corridor which is wider than the traveling corridor of the vehicle.

2. The method as claimed in claim 1, comprising the step of selecting the width of the object corridor (O) in a distance-dependent manner.

3. The method as claimed in claim 1, wherein the object corridor (O) is as wide as a roadway width of the roadway on which the vehicle (1) is moving.

4. The method as claimed in claim 3, wherein the traveling corridor (F) is narrower than the roadway of the vehicle.

5. The method as claimed in claim 1, comprising the steps of, wherein the vehicle (1) to be controlled monitors other vehicles (E1, E2, E3) traveling ahead in a wireless manner and, from the vehicles (E1, E2, E3), selects those vehicles which are situated in its traveling corridor (F), the vehicle (1) which is at the smallest distance from the controlling vehicle (1) being identified as the control object (E1).

6. The method as claimed in claim 1, wherein said object corridor (O) is determined from the traveling corridor (F) of the vehicle (1) to be controlled.

7. The method as claimed in claim 1, wherein anticipated traveling corridor (F) of the vehicle (1) is determined with aid of intrinsic speed and of yaw rate.

8. The method as claimed in claim 7, wherein said traveling corridor (F) of the vehicle (1) is determined from the yaw rate of the vehicle (1) which is measured by a yaw rate sensor.

9. The method as claimed in claim 7, wherein the traveling corridor of the vehicle is determined by turn radius determined from differential speed of two vehicle wheels, in particular the wheels of one axle.

10. The method as claimed in claim 9, comprising the steps of measuring the wheel speed of the two vehicle wheels, and determining the yaw rate of the vehicle from the difference between the two wheel speeds.

11. An arrangement for carrying out the method as claimed in claim 1, wherein a sensor (3) monitors objects (E1, E2, E3) appearing in a direction of travel of the vehicle (1), and a sensor signal processing arrangement (11) connected to the sensor (3) passes the distance and the relative speed of the monitored objects to a control device (12) which determines the object corridor (O) of the vehicle (1).

12. The arrangement as claimed in claim 11, wherein the sensor (3) is arranged on a front of the vehicle (1) for monitoring the control object (E1) traveling ahead.

13. The arrangement as claimed in claim 11, wherein the sensor (3) operates according to echo principle.

14. The arrangement as claimed in claim 13, wherein said sensor (3) is a radar sensor.

15. The arrangement as claimed in claim 11, wherein said control device (12) determines the traveling corridor (F) of the vehicle (1) and sets the distance from the control object (E1).

16. The arrangement as claimed in claim 11, wherein the sensor (3), the signal processing arrangement (11) and the control device (12) form a structural unit.

17. A method for determining a control object whose distance from a following vehicle is measured, the distance between the control object and the vehicle being adjusted to a desired distance if the control object is situated in an expected traveling corridor of the following vehicle, comprising the steps of even after the control object has left the traveling corridor, continuing controlling of the has left the traveling corridor, continuing controlling of the distance with respect to said control object as long as the control object stays in an object corridor which is wider than the traveling corridor of the vehicle, wherein the vehicle (1) to be controlled monitors other vehicles (E1, E2, E3) traveling ahead in a wireless manner and, from the vehicles (E1, E2, E3), selects those vehicles which are situated in its traveling corridor (F), the vehicle (1) which is at the smallest distance from the controlling vehicle (1) being identified as the control object (E1), said object corridor (O) is determined from the traveling corridor (F) of the vehicle (1) to be controlled, and wherein anticipated traveling corridor (F) of the vehicle (1) is determined with aid of intrinsic speed and of yaw rate.

* * * * *